June 22, 1965 T. W. WILLIAMSON 3,190,337
TIRE CHAIN ASSEMBLY
Filed Oct. 2, 1961 2 Sheets-Sheet 1
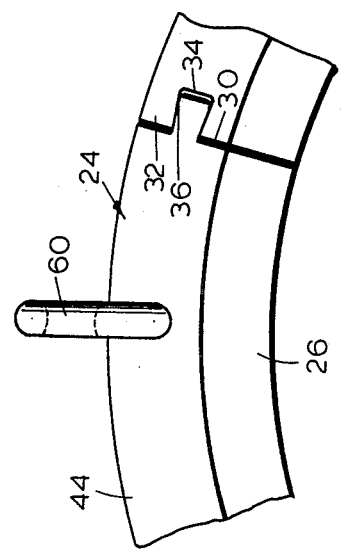
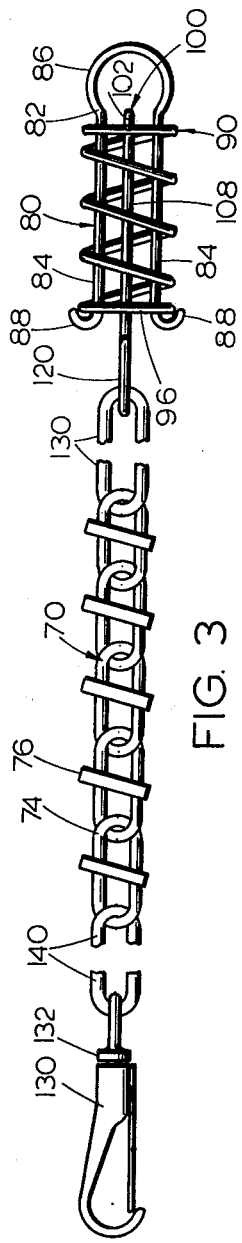
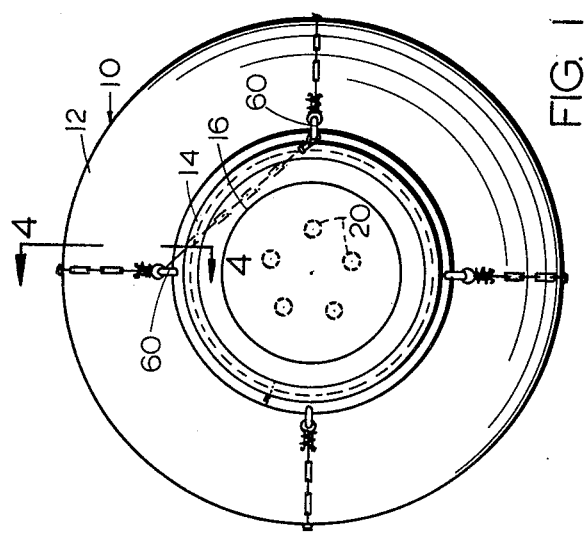
INVENTOR.
TRAVIS W. WILLIAMSON
BY June 22, 1965  T. W. WILLIAMSON  3,190,337
TIRE CHAIN ASSEMBLY Filed Oct. 2, 1961  2 Sheets-Sheet 2

INVENTOR.
TRAVIS W. WILLIAMSON
BY Hiram A. Sturges
Agent

United States Patent Office 3,190,337
Patented June 22, 1965

3,190,337
TIRE CHAIN ASSEMBLY
Travis W. Williamson, 6930 Western Ave., Omaha, Nebr.
Filed Oct. 2, 1961, Ser. No. 146,033
4 Claims. (Cl. 152—233)

This invention relates to tire chains and anti-skid devices for automobiles, and more particularly it is an object to provide an anti-skid device, the chains of which can be stored upon the wheel when not in use.

A common disadvantage of tire chains has been in that much travel is from a snowbound lesser used street or road to a paved highway or main road which latter has usually been cleared of snow. Chains have been so difficult to remove that motorists have commonly kept their chains on their tires during many miles of travel on the cleared pavement. This has worn chains out quickly, provided bumpy driving, and is destructive to the pavement.

The problem of the storage of anti-skid devices on tires has been approached before from the standpoint of a rigid anti-skid member extendable around a tire. However, it is an object of this invention to provide means for storing chain anti-skid units whereby their flexibility adapts them to fit tires of various sizes and conditions of inflation and also makes possible inexpensive cost and ease of replacement.

A further object of this invention is to provide means for storage of the chain units on a tire in such a way that they will be drawn taut for preventing them from slapping against the wheels, whereby they are quiet.

A particular object is to provide a flexible unit including a chain portion for road engagement and also including means at each end of the chain for connection and disconnection of the lugs at the side of the tire and further in combination with spring means for drawing the chain section taut.

Yet another object is to provide a concept of the spacing of the lugs about the wheel for making possible the storage of chains in such a way that an inner end of the chain can be disconnected from its lug and connected to an anchoring point on the outer side of the wheel for storage of the chain unit without the necessity for the disconnection of the outer end of the chain.

I am aware that an anti-skid device has been conceived heretofore in which lugs are disposed near the rim, however, it is an object of this invention to provide closed lugs, that is, lugs with openings therethrough for receiving flexible units in such a way that they can be moved from use positions to storage positions without disconnection from that lug which is used by the flexible member in both storage and use positions.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 1 is a side elevation of a wheel with the anti-skid devices of this invention mounted thereon, a storage position of one of the flexible units of the device being shown in dotted lines.

FIGURE 2 is a detail showing the dove-tailed joint between the ends of one of the anchor plates of the invention, the remainder of the anchor plate not being shown.

FIGURE 3 is a detail of one of the flexible units of the invention, with parts broken away.

Figure 5:
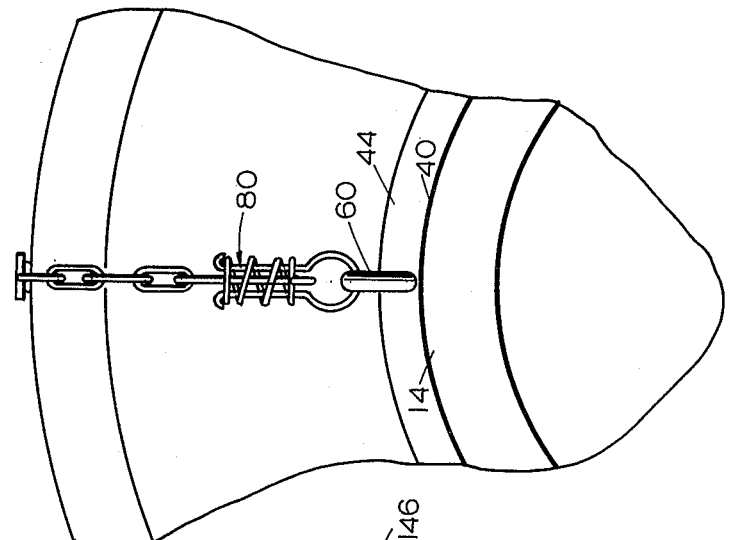
FIGURE 5 is a side elevational detail of a section of the wheel of FIGURE 1 adjacent one of the flexible units.

Referring now to the drawings for a more particular description, a conventional wheel of an automobile, truck or the like is generally indicated at 10, having a tire 12, a rim 14, and a hub cap 16, the rim having conventional apertures 20 therethrough for receiving wheel lugs.

Figure 4:
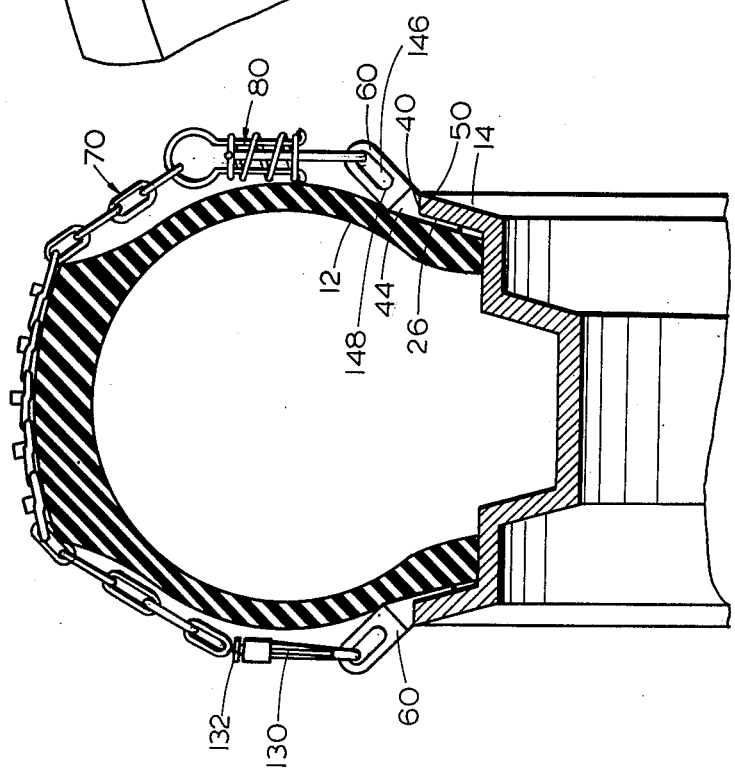
FIGURE 4 is a sectional view taken along the line 4—4 of FIGURE 1.

In accordance with this invention, a pair of anchor plates generally indicated at 24 are provided, one on each side of the wheel, each anchor plate having an an inner portion 26 which is very thin and adapted to be retained between the tire 12 and the rim 14 as best seen in FIGURE 4.

Each anchor plate 24 is substantially of an annular shape, more specifically of circular shape, although each anchor plate 24 is not a completely closed circle and the term anchor plate 24 as used herein need not necessarily be a single piece.

As best seen in FIGURE 2, terminal ends 30 and 32 of an anchor plate 24 are preferably interconnected by the recess 34 and dove-tailed protrusion 36 of the dove-tail assembly whereby the anchor plate 24 can, if desired, be substantially a complete unbroken circle except for one break-off place at the ends 32 and 34. The ends 32 and 34 are preferably separatable somewhat because the anchor plate 24 has a certain amount of flexibility and resiliency sufficient for facilitating the ends 32 and 34 to be spaced apart to fit over the outer edge 40 of the largest diameter portion of the rim, and so that once fitted into place between the tire 12 and rim 14, the ends 32 and 34 can be dove-tailed together, and then the tire inflated for firmly holding the anchor plate in place.

Each anchor plate has an outermost portion 44 which is relatively thick in a direction parallel to an axis of the wheel 10 and in an area extending along the exposed wall of the tire 12 adjacent the rim 14, that portion of the anchor plate 24 which extends along the exposed wall of the tire having an undersurface 50, best seen in FIGURE 4, which extends transversely to the innermost portion 26 of the anchor plate and preferably in parallelism with the axis of the wheel 10, and being circular in shape for engaging the outer edge 40 of the rim 14.

That relatively thick portion 44 of an anchor plate which lies along the exposed wall of the tire adjacent the rim has lugs 60 extending outwardly therefrom away from the tire 12, the lugs 60 being anchor lugs for later described flexible members 70 seen in FIGURES 3 and 4.

The anchor lugs 60 are disposed at spaced apart points adjacent the periphery of the rim 14 on the outer and also on the inner side of the wheel, and therefore, on the outer and also on the inner anchor plates 24.

Each flexible member 70 preferably has a chain 74 which comprises a large part of the length of the flexible member 70 and which is adapted to extend over the outside of the tire 12 of a wheel so as to engage the roadway surface. The chain 74 can be provided with bars 76 thereon for engaging a roadway surface, the bars 76 being one on each link of the chain 74.

The flexible member 70 further has in it a resilient and releasable assembly generally indicated at 80.

Resilient and releasable assembly 80 preferably has a first portion 82 which is substantially of a U-shape having substantially parallel arm portions 84, the arm portions being connected by a connecting portion 86 which is disposed through and received on, or in another sense received, a respective lug 60, as best seen in FIGURE 1.

The ends of the arm portions 84 are shown at 88 and preferably out-turned away from each other.

The assembly 80 further has a coiled compression spring 90 disposed about the arms 84 on their outer sides and the outturned ends 88 of the arms 84 extend over the respective sides of an end coil 96 of the spring 90.

The assembly 80 further comprises a third portion which is substantially U-shaped and generally indicated at 100, the third portion having a shape identical to the shape of the section 80 and thereby requiring no further description, except that its out-turned ends 102 are disposed extending outwardly over the opposite end of the spring 90 from the ends 88. The arms 108 of the U-shaped member 100 extend through the coiled spring and the closed end or connecting portion 120 thereof is disposed about the end link 130 of the flexible member 70.

The flexible member 70 can also be referred to as a tread member and it will be seen that the arms 108 of the U-shaped member 120 can be pressed together for releasing the flexible member or tread member 70 for replacement at desired times.

At the opposite end of the tread member of flexible member 70 from the assembly 80, a snap hook 130 is provided which is adapted to swivel at 132, the snap hook being connected to the opposite endmost link 140 of the flexible member 70.

As thus described, it will be seen that at times when the assembly 80 is connected to a lug 60, preferably on the outer side of the wheel 10, then the snap hook 130 is connected to a lug 60 on the inner side of the wheel 10 during use.

In operation it will be seen that to put the anti-skid devices of this invention in storage position, it is only necessary to unhook the snap hooks 130 from the inner side of the tire and to connect them to a next adjacent lug 60 for storing them on the outer side of the wheel.

It will be seen that the lugs of one side of the tire are either four or a multiple of four in number and are equidistantly spaced apart.

It is preferable that when four lugs are used that the lugs have openings therethrough as seen at 146 in FIGURE 4, which are for a 14-inch tire diameter approximately thirteen and one-half inches apart, as measured from the inside 148 of one lug opening to the inside 148 of an adjacent lug opening.

When a multiple of four lugs is used for each side of the tire, then it will be seen that this same thirteen and one-half inch measurement is to be taken not between adjacent lugs, but across by-passed lugs to that lug which is at the spacing of the length of the respective flexible unit 70. The thirteen and one-half inch measurement has been found to be workable for a wheel of standard fourteen inch diameter most commonly used on cars today.

It is important that a lug used for storage is spaced apart a distance from that lug which anchors the normally anchored end of the given flexible unit, which distance is sufficiently close to the total length of that flexible unit 70 as to make it possible to prevent that flexible unit hanging across the hub cap 16 in a way such as to contact the hub cap, for otherwise, the vibration of the hard chain of the flexible unit would damage the hub cap, and this distance should also be such that a flexible unit does not hang beyond the periphery of the tire during storage whereby contact with the roadway is avoided.

It will be seen that the resilient and releasable assembly 80 also serves as a slack pick-up means for maintaining the flexible unit sufficiently taut while in storage and whereby they do not tend to hang beyond the tire sufficiently to engage a roadway during storage.

It will be seen that the outermost ends of the lugs project to the side of the wheel 10 a distance sufficient that when the flexible units 70 are in storage positions, they do not come in direct contact with the rim 14 of the wheel.

It will be seen that the lugs 60 have closed walls with the openings 146 therethrough, rather than open walls as would be the case if they were hooks. Also, the openings 146 are elongated in a direction normal to the axis of the wheel in order to make it possible for the respective flexible unit attached thereto to snugly fit the tire when in use position whereby a lesser reliance on a slack take-up device such as that shown in the assembly 80 is needed for achieving a snug fit since such lesser need for reliance on a slack take-up device makes possible easier manipulation of the take-up device.

It will be seen that attachment and release of the anchor plates 24 from a wheel is facilitated because they are preferably not completely closed and are formed of such resilient material that they can be distorted from circular shape in order to facilitate their being placed on a tire in the position shown in FIGURE 4.

As thus described, it will be seen that this invention has provided means for storing chain anti-skid units in such a way that they are readily available to be put in use. A motorist can simply go to the back of his car, unhook that chain flexible unit 70 which is disposed in the area between ground level and his bumper, unhooking the snap hook 130 from a storage lug and connecting it on the inside of a tire to an operational lug.

After doing this with the other tire, the motorist is all ready for most conditions. However, if the conditions are particularly bad, he can drive the car forward in several stages and intermittently in several stages connect the other chains.

In this way, the operator can connect all chains or flexible units 70 without having to jack up his car, and without the necessity of crawling under the car.

As can be seen in FIGURE 3, the proportional size of the spring 90 and hooks 88 are such that the spring is large enough in proportion to the size of the hooks that the hooks can be rapidly disengaged from the spring 90 and the U-shaped member 82 removed from the spring 90 with ease.

From the foregoing description, it is thought to be obvious that a tire chain assembly constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. An anti-skid device for a rim-mounted tire comprising means attachable to said wheel for providing a plurality of fixed anchor lugs at spaced apart points adjacent the periphery of said rim on the outer and also on the inner side of said wheel, said lugs being in pairs, the lugs of a pair being disposed on the outer and inner sides of a wheel opposite each other, a plurality of flexible units for extending transversely around the outer side of a tire at spaced apart places around the largest periphery of the tire, said units each comprising a tread member for extending in a use position transversely across the exterior portion of the tire, and further comprising releasable means for securing one of the ends of said tread members to one lug of a pair and means for securing the other end of that tread member to the other lug of the same pair in such a way that the other end will not become detached if the respective flexible member is moved into a storage position extending across only one side of the wheel, said flexible units each having one end which is normally anchored to a lug and a transposable end which is released from its lug for movement to a storage position, the lugs being spaced such that when the transposable end of a given flexible unit is disconnected from a respective certain lug, then that transposable end can be connected for storage to a lug on the opposite side of said wheel from said certain lug, the lugs being spaced apart a distance such that when the transposable end of a flexible unit is disconnected from its use position lug, it can be connected to a lug on the other side of said wheel spaced apart a distance from that lug which anchors the normally anchored end thereof, said distance being substantially the total length of that flexible unit whereby said flexible units can be stored in straightened positions when not in use.

2. An anti-skid device for a rim-mounted tire comprising means attachable to said wheel for providing a plurality of fixed anchor lugs at spaced apart points adjacent the periphery of said rim on the outer and also on the inner side of said wheel, said lugs being in pairs, the lugs of a pair being disposed on the outer and inner sides of a wheel opposite each other, a plurality of flexible units for extending transversely around the outer side of a tire at spaced apart places around the largest periphery of the tire, said units each comprising a tread member for extending in a use position transversely across the exterior portion of the tire, each said flexible member having in it a resilient and releasable means comprising a resilient disconnection unit having a first portion having a main section which is substantially of a U-shape having substantially parallel arm portions, said U-shaped member receiving a respective lug thereon, the ends of said U-shaped section being out-turned away from each other, a second portion which is a coiled compression spring disposed around the outer side of a part of the arms of said U-shaped first portion, with the out-turned ends of the arms of said U-shaped first portion extending over the respective sides of an end coil of said spring, and a third portion identical to said first portion and the out-turned ends of the arms of said third portion overlapping opposite sides and end coil of said spring at the opposite end of said spring, said third portion being disposed through and receiving thereon an end of the respective tread member, the said arms of one of said substantially U-shaped members being adapted to be pushed toward each other and the size of said spring being sufficiently large in proportion to the size of said hooks for the rapid disengagement of said hook ends from said coil by the passing of said ends through said coil.

3. An anti-skid device for a rim-mounted tire comprising means attachable to said wheel for providing a plurality of fixed anchor lugs at spaced apart points adjacent the periphery of said rim on the outer and also on the inner side of said wheel, said lugs being in pairs, the lugs of a pair being disposed on the outer and inner sides of a wheel opposite each other, a plurality of flexible units for extending transversely around the outer side of a tire at spaced apart places around the largest periphery of the tire, said units each comprising a tread member for extending in a use position transversely across the exterior portion of the tire, and further comprising releasable means for securing one of the ends of said tread members to one lug of a pair and means for securing the other end of that tread member to the other lug of the same pair in such a way that the other end will not become detached if the respective flexible member is moved into a storage position extending across only one side of the wheel, said flexible units each having one end which is normally anchored to a lug and a transposable end which is released from its lug for movement to a storage position, the lugs being spaced such that when the transposable end of a given flexible unit is disconnected from a respective certain lug, then that transposable end can be connected for storage to a lug on the opposite side of said wheel from said certain lug and mounted on said attachable means, said storage lug being spaced apart a distance from that lug which anchors the normally anchored end of said given flexible unit which distance is sufficiently close to the total length of that flexible unit to make it possible to prevent said certain flexible unit from hanging across the hub cap of said wheel so that the hub cap is not damaged by contact with a vibrating chain and so that a flexible unit does not hang beyond the tire during storage so that contact with a roadway is avoided.

4. An anti-skid device for a rim-mounted tire comprising means attachable to said wheel for providing a plurality of fixed anchor lugs at spaced apart points adjacent the periphery of said rim on the outer and also on the inner side of said wheel, said lugs being in pairs, the lugs of a pair being disposed on the outer and inner sides of a wheel opposite each other, a plurality of flexible units for extending transversely around the outer side of a tire at spaced apart places around the largest periphery of the tire, said units each comprising a tread member for extending in a use position transversely across the exterior portion of the tire, and further comprising releasable means for securing one of the ends of said tread members to one lug of a pair and means for securing the other end of that tread member to the other lug of the same pair in such a way that the other end will not become detached if the respective flexible member is moved into a storage position extending across only one side of the wheel, said flexible units each having one end which is normally anchored to a lug and a transposable end which is released from its lug for movement to a storage position, the lugs being spaced such that when the transposable end of a given flexible unit is disconnected from a respective certain lug, then that transposable end can be connected for storage to a lug on that opposite side of said wheel from said certain lug and mounted on said attachable means, means for causing said flexible units to be taut while in storage positions and the outermost ends of said lugs projecting to the side of said wheel a distance sufficiently that when said flexible units are in storage positions they do not come into direct contact with said rim.

References Cited in the file of this patent

UNITED STATES PATENTS

| | | |
|---|---|---|
| 1,266,345 | Swope | May 14, 1918 |
| 1,995,758 | Stokke et al. | Mar. 26, 1935 |
| 2,204,886 | Devlin | June 18, 1940 |
| 2,537,231 | Necrason | Jan. 9, 1951 |
| 2,898,966 | Machesney | Aug. 11, 1959 |
| 2,933,311 | Spak | Apr. 19, 1960 |